United States Patent

Watanabe

[11] Patent Number: 6,015,486
[45] Date of Patent: Jan. 18, 2000

[54] DISPENSING APPARATUS CAPABLE OF AVOIDING VARIATION IN DISPENSED AMOUNT AND IMPROVING A SANITARY CONDITION

[75] Inventor: Kazushige Watanabe, Maebashi, Japan

[73] Assignee: Sanden Corporation, Japan

[21] Appl. No.: 09/076,765

[22] Filed: May 13, 1998

[30] Foreign Application Priority Data

May 15, 1997 [JP] Japan .................................. 9-125633

[51] Int. Cl.⁷ ............................ B01D 17/12; B01D 24/46
[52] U.S. Cl. ............................... 210/87; 210/93; 210/97; 210/269; 222/129.1
[58] Field of Search ......................... 210/87, 97, 110, 210/243, 282, 184, 186, 257.2, 670, 739, 93; 222/56, 59, 129.1, 146.1, 146.2, 189.06; 259/266, 269

[56] References Cited

U.S. PATENT DOCUMENTS

| | | | |
|---|---|---|---|
| 4,013,554 | 3/1977 | Reis et al. | 210/243 |
| 4,160,727 | 7/1979 | Harris | 210/257.2 |
| 4,761,295 | 8/1988 | Casey | 210/257.2 |
| 4,801,375 | 1/1989 | Padilla | 210/110 |
| 5,254,243 | 10/1993 | Carr et al. | 210/110 |
| 5,281,330 | 1/1994 | Oikawa et al. | 210/243 |
| 5,324,434 | 6/1994 | Oikawa et al. | 210/243 |
| 5,494,573 | 2/1996 | Schoenmeyr et al. | 210/257.2 |
| 5,540,107 | 7/1996 | Silverman et al. | 210/87 |
| 5,876,610 | 3/1999 | Clack et al. | 210/87 |
| 5,911,884 | 6/1999 | Boulter | 210/739 |

FOREIGN PATENT DOCUMENTS

5-138158  6/1993  Japan .

*Primary Examiner*—Joseph W. Drodge
*Attorney, Agent, or Firm*—Banner & Witcoff, Ltd.

[57] ABSTRACT

In a dispensing apparatus having a water purification unit for purifying raw water to produce purified water, a beverage unit for producing the beverage by the use of the purified water, and a pipeline for conducting the purified water from the water purification unit to the beverage unit, a flow rate detector is connected to the pipeline. The flow rate detector detects a flow rate of the purified water in the pipeline to produce a flow rate signal. Responsive to the flow rate signal, a control arrangement controls supply of the raw water into the water purification unit.

8 Claims, 7 Drawing Sheets

DISPENSING APPARATUS CAPABLE OF AVOIDING VARIATION IN DISPENSED AMOUNT AND IMPROVING A SANITARY CONDITION

BACKGROUND OF THE INVENTION

This invention relates to a dispensing apparatus for dispensing drinking water for domestic or business use with a function of purifying and sterilizing raw water such as tap water and groundwater.

As conventional dispensing apparatuses of the type, a beverage dispenser for dispensing or vending a cup of coffee or a carbonic beverage and a tea server for serving a cup of tea are known and widely used. Each of the beverage dispenser and the tea server is provided with a water purification unit.

By way of example, the beverage dispenser will be described. The beverage dispenser comprises the water purification unit for purifying raw water such as tap water to produce purified water, and a beverage unit for producing the beverage such as the coffee or the carbonic beverage by the use of the purified water produced by the water purification unit. In response to a predetermined vending operation performed in the beverage unit, the beverage is vended or dispensed. The beverage dispenser further comprises a pressure detector disposed in a pipeline for feeding the purified water from the water purification unit to the beverage unit. The pressure detector detects a water pressure within the pipeline as a pipeline water pressure. When the vending operation is performed in the beverage unit, the purified water flows through the pipeline so that the pipeline water pressure is changed. Thus, the pressure detector detects the flow of the purified water, i.e., the occurrence of the vending operation in the beverage unit to open a water supply valve which is normally-closed electromagnetic valve and serves as a source valve of the water purification unit.

As described above, when the vending operation is performed in the beverage unit, it is detected by the pressure detector to open the water supply valve. Thus, the beverage using the purified water is vended.

In the above-mentioned conventional dispensing apparatus, whether or not the vending operation is carried out in the beverage unit is detected by the pressure detector. Therefore, the timing of operating the water supply valve is greatly affected by a local water pressure which has different values between districts or places where the dispensing apparatus is installed.

Figure 1:
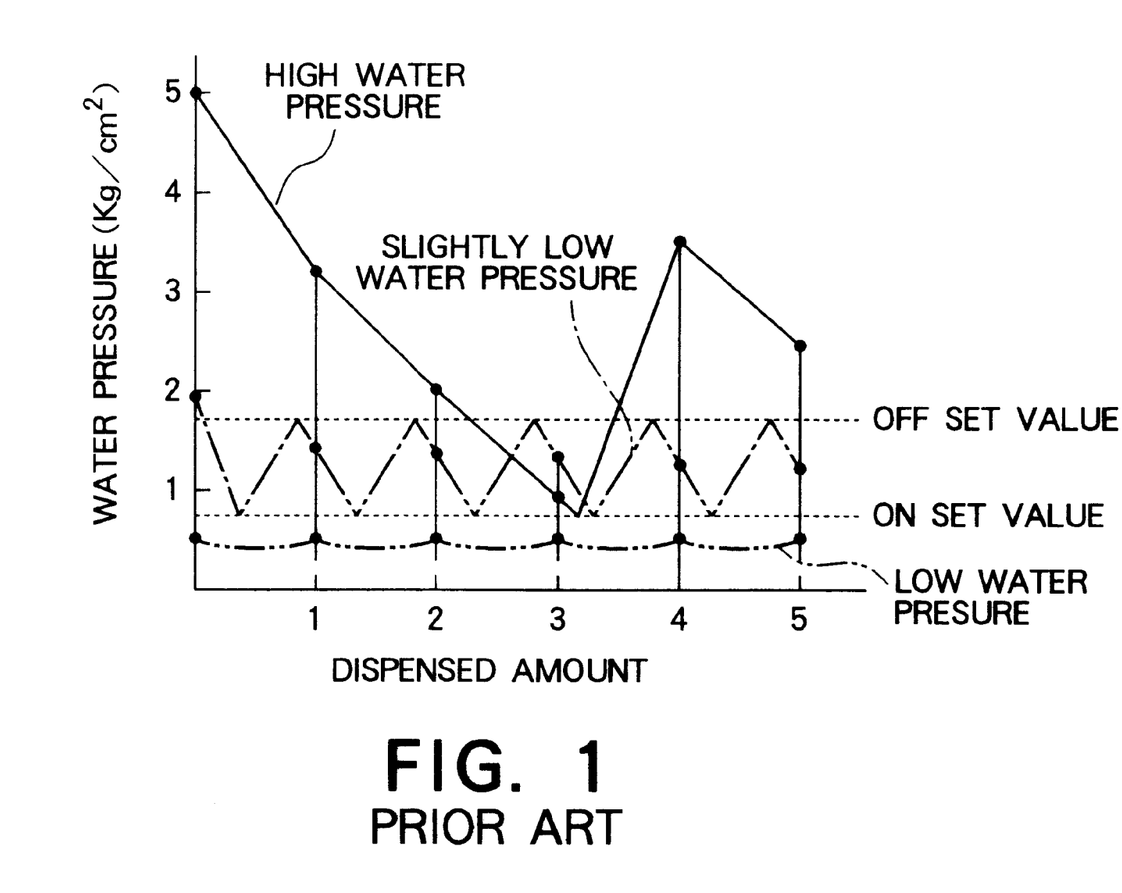
FIG. 1 is a graph showing a relationship between a dispensed amount and a pipeline water pressure in a conventional dispensing apparatus.

Referring to FIG. 1, a dispensed amount of the beverage in terms of the number of cups and the pipeline water pressure are plotted in an abscissa and an ordinate, respectively. Specifically, it is assumed that the local water pressure of the tap water is high at the place or in the district where the dispensing apparatus is installed. In this event, the pipeline water pressure is already kept high in a standby state before the vending operation is started. For example, if the pipeline is formed by a flexible tube, the flexible tube is expanded because of such a high pipeline water pressure. When a pouring port at the end of the dispensing apparatus is opened during the vending operation, the dispensed amount corresponding to three cups is supplied in a single vending operation as depicted by a solid line in the figure. In addition, a pressure difference is great between one vending operation and a next vending operation. Therefore, the dispensed amount varies between successive vending operations. In the next vending operation, the water supply valve is opened again to flow tap water through the water purification unit into the pipeline. At this time, a difference between a flow-in pressure of the tap water and the pipeline water pressure is extremely great. This results in a phenomenon known as the "water hammer".

On the contrary, if the local water pressure of the tap water is low at the place or in the district where the dispensing apparatus is installed, the pressure detector must have ON and OFF set values which are considerably low with a small difference therebetween as depicted by a two-dot-and-dash line in FIG. 1. Such setting is difficult and troublesome. If the set values are set in correspondence to a normal water pressure, the pressure detector always produces an open signal to the water supply valve irrespective of whether or not the vending operation is performed. Therefore, the water supply valve is always kept energized and opened. This often results in a disorder of the water supply valve. In addition, if the water supply valve is always kept opened, bacteria are allowed to intrude through the pouring port of the beverage unit to contaminate the tap water as the raw water. Thus, a sanitary problem arises. Furthermore, upon occurrence of water leakage in the dispensing apparatus, such water leakage will uninterruptedly last if the water supply valve is always kept opened. Therefore, an additional arrangement is required to avoid the water leakage.

In case where the set values of the pressure detector are slightly lower than the local water pressure of the tap water, the water supply valve is very frequently opened and closed as depicted by a dash-and-dot line in FIG. 1 to cause the so-called chattering. This shortens the lifetime of the water supply valve.

SUMMARY OF THE INVENTION

It is therefore an object of this invention to provide a dispensing apparatus capable of preventing variation of a dispensed amount at each vending operation and improving a sanitary condition by controlling a water supply valve in response to a detection signal from a flow rate detector.

Other objects of this invention will become clear as the description proceeds.

A dispensing apparatus to which this invention is applicable is for dispensing a beverage and comprises a water purification unit for purifying raw water to produce purified water, a beverage unit for producing the beverage by the use of the purified water, a pipeline connected between the water purification unit and the beverage unit for conducting the purified water from the water purification unit to the beverage unit, detecting means connected to the pipeline for detecting flow of the purified water in the pipeline to produce a detected signal, and control means connected to the detecting means for controlling supply of the raw water into the water purification unit in response to the detected signal. In the dispensing apparatus, the detecting means comprises a flow rate detector for detecting a flow rate of the purified water in the pipeline to produce a flow rate signal as the detected signal.

DESCRIPTION OF THE PREFERRED EMBODIMENT

Figure 2:
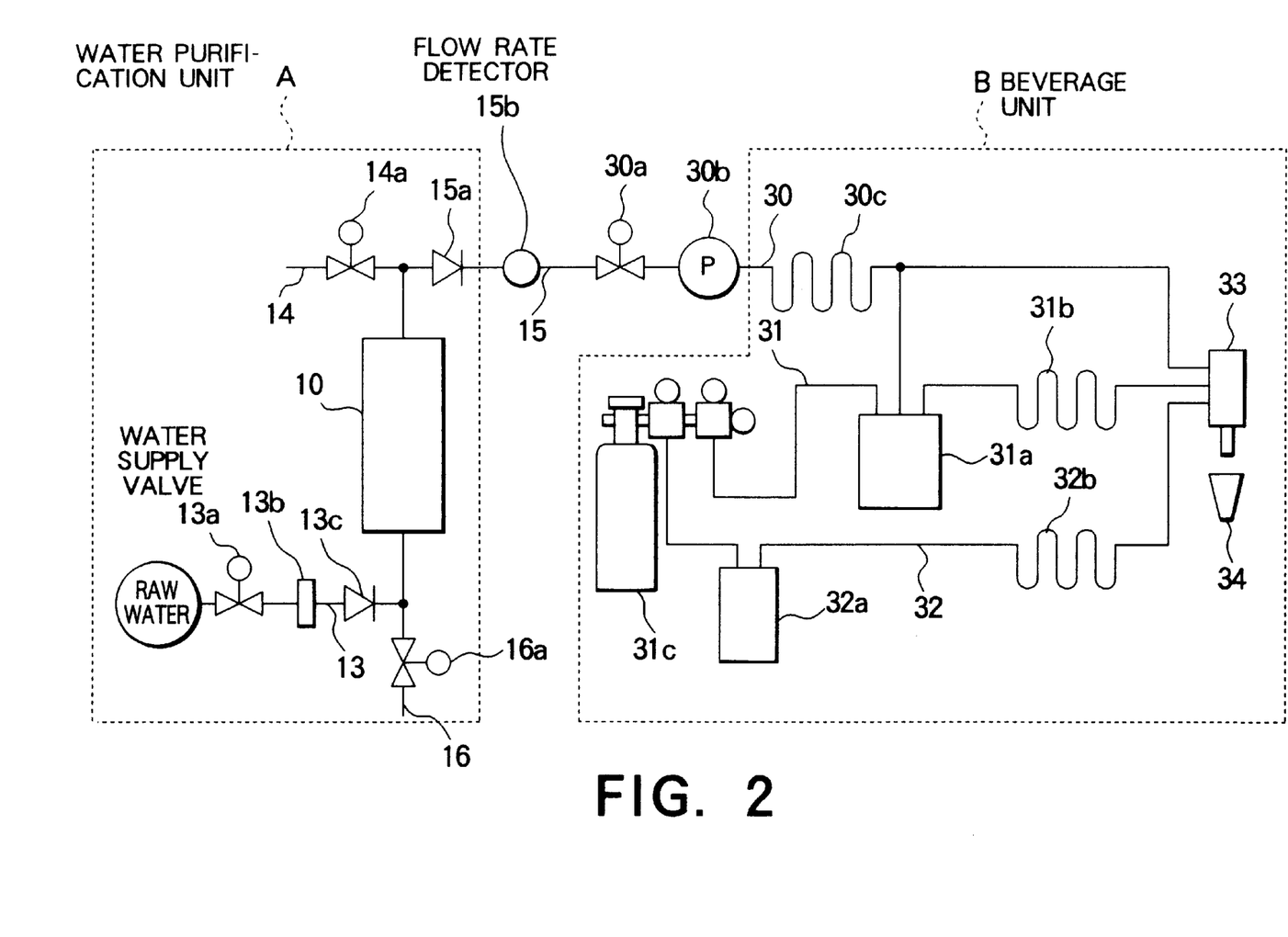
FIG. 2 is a water circuit diagram of a dispensing apparatus according to an embodiment of this invention.

Referring to FIG. 2, a dispensing apparatus according to an embodiment of this invention comprises a water purification unit A for purifying raw water such as tap water to produce purified water and a beverage unit B for producing a beverage by the use of the purified water supplied from the water purification unit A.

Figure 3:
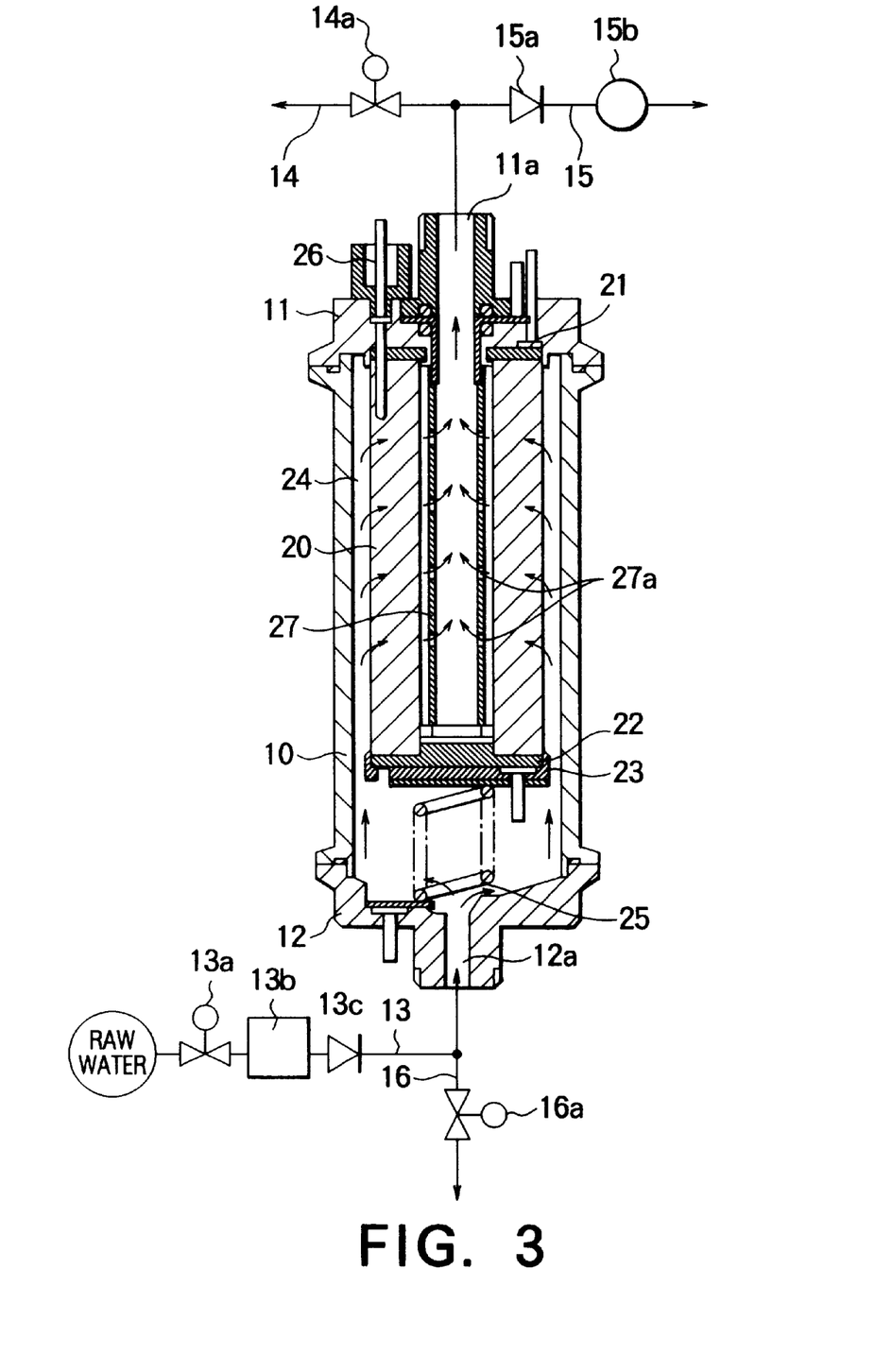
FIG. 3 is a sectional view of a water purification unit illustrated in FIG. 2.

Referring to FIG. 3, the water purification unit A comprises a cylindrical water tank 10 for storing the raw water. The water tank 10 has upper and lower ends closed by upper and lower caps 11 and 12, respectively. The upper cap 11 is provided with an outlet port 11a communicating with the beverage unit B while the lower cap 12 is provided with an inlet port 12a for introducing the raw water into the water tank 10. The inlet port 12a is connected to a water supply pipe 13 with a normally-closed water supply valve 13a, a prefilter 13b, and a check valve 13c. The water supply valve 13a is for allowing and inhibiting passage of the raw water. The check valve 13c serves to prevent backflow of the raw water from the water tank 10.

The outlet port 11a is connected to a bifurcated pipeline divided into an air introduction pipe 14 and a purified water introduction pipe 15 which is referred to as a pipeline. The air introduction pipe 14 is provided with an air introduction valve 14a while the purified water introduction pipe 15 is provided with a check valve 15a and a flow rate detector 15b. The check valve 15a is for checking flow of the purified water through the purified water introduction pipe 15. The flow rate detector 15b is for detecting the flow rate of the purified water in the purified water introduction pipe 15b to produce a detected signal or a flow rate signal. The flow rate detector 15b is referred to as a detecting arrangement and will far later be described in detail.

The inlet port 12a communicates with a discharge pipe 16 provided with a discharge valve 16a. When the air introduction valve 14a and the discharge valve 16a are closed and the water supply valve 13a is opened, the water tank 10 is supplied with the raw water. When these valves are reversely operated, the raw water in the water tank 10 is discharged.

The water tank 10 has a cylindrical adsorber portion 20 arranged therein. The adsorber portion 20 is formed by activated carbon fiber having conductivity. The adsorber portion 20 has an upper end held by the upper cap 11 through a first electrode 21 of a flat shape and a lower end held by a holder 23 through a second electrode 22 of a flat shape. An annular path 24 is defined between an outer surface of the adsorber portion 20 and an inner surface of the water tank 10 to communicate with the inlet port 12a. Within the water tank 10, the raw water introduced via the inlet port 12a flows into the adsorber portion 20 through the path 24. A conductive coil spring 25 is interposed between the lower end of the adsorber portion 20 and the lower cap 12. The coil spring 25 serves to urge the adsorber portion 20 towards the upper cap 11 so that the adsorber portion 20 is fixedly held in the water tank 10. The adsorber portion 20 is provided with a temperature sensor 26 for detecting the temperature of the raw water in the water tank 10. Inside the adsorber portion 20, an outflow pipe 27 extends in a vertical direction with a predetermined space kept therefrom. The outflow pipe 27 has a number of water passage holes 27a for leading the purified water passing through the adsorber portion 20 to the outlet port 11a. The outflow pipe 27 is formed by a conductive material and serves as a third electrode. The conductive material comprises a titanium base coated with platinum, platinum and iridium, carbon, or a carbon-mixed resin and has a small chlorine overvoltage.

As described above, the water purification unit A according to the embodiment has the first, the second, and the third electrodes 21, 22, and 27. During a water purification mode, a bacteriostatic operation is carried out to suppress propagation of the bacteria. Specifically, a d.c. voltage is applied through the second and the third electrodes 22 and 27 to the adsorber portion 20 with the raw water contained therein. On the other hand, during a reproduction mode, a sterilizing operation is carried out. Specifically, the adsorber portion 20 is applied with an a.c. voltage through the first and the second electrodes 21 and 22. The adsorber portion 20 is thus heated and washed to desorb trihalomethane and organic substances and to destroy the bacteria. In the reproduction mode, a combination of the first and the second electrodes 21 and 22 will be referred to as a reproducing arrangement or a voltage applying arrangement. The water purification mode and the reproduction mode are alternately operated at a predetermined interval.

On the other hand, the beverage unit B comprises a dilution water line 30 for feeding dilution water, a carbonic water line 31 for producing carbonic water, and a syrup line 32 for feeding syrup, as illustrated in FIG. 2. A dispensing valve 33 is connected to the dilution water line 30, the carbonic water line 31, and the syrup line 32 to be supplied with the dilution water, the carbonic water, and the syrup which are mixed to produce the beverage. The beverage is poured from the dispensing valve 33 into a cup 34.

The dilution water line 30 is connected to the purified water introduction pipe 15 of the water purification unit A and has a water introduction valve 30a and a water pump 30b downstream of the purified water introduction pipe 15. In response to a valve open signal of the dispensing valve 33, the water introduction valve 30a is opened and the water pump 30b is operated. The purified water fed by the water pump 30b is cooled by a first cooling coil 30c to be supplied to the dispensing valve 33.

The carbonic water line 31 has a carbonator 31a. A part of the purified water cooled by the first cooling coil 30c is introduced into the carbonator 31a. The carbonator 31a is also supplied with a carbonic-acid gas from a carbonic-acid gas cylinder 31c so that the purified water is mixed with the carbonic-acid gas to produce the carbonic water. The carbonic water is cooled by a second cooling coil 31b to be supplied to the dispensing valve 33.

The syrup line 32 is connected to a syrup tank 32a to supply the dispensing valve 33 with the syrup taken out from the syrup tank 32a and cooled by a third cooling coil 32b. The syrup tank 32a is also connected to the carbonic-acid gas cylinder 31c so that carbonic syrup can be produced in the syrup tank 32a to be supplied to the dispensing valve 33.

Figure 4:
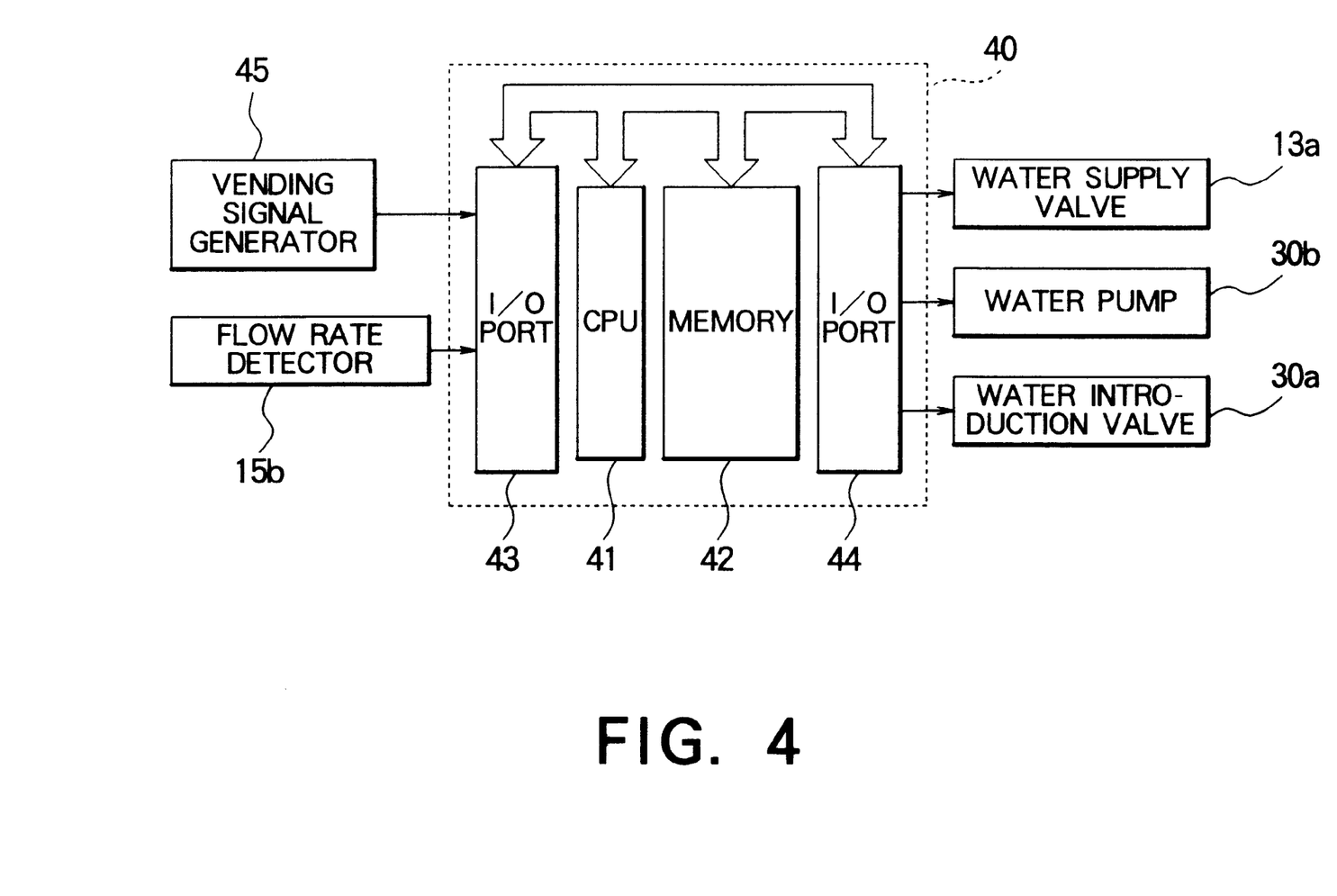
FIG. 4 is a block diagram of a control section of the dispensing apparatus illustrated in FIG. 2.

Referring to FIG. 4, a control section of the dispensing apparatus will be described. The control section controls the water supply valve 13a, the water introduction valve 30a, and the water pump 30b in response to the detection signal produced by the flow rate detector 15b.

The dispensing apparatus according to the embodiment comprises a control unit 40 implemented by a microcomputer and is automatically operated. The control unit 40 comprises a central processing unit (CPU) 41 and a memory 42 storing a control program. The control unit 40 has I/O ports 43 and 44 for input of signals from the flow rate detector 15b and a vending signal generator 45 for producing a vending signal representative of an opening operation of the dispensing valve 33 and for output of signals to the water supply valve 13a, the water introduction valve 30a, and the water pump 30b. With this structure, the control unit 40 is responsive to the signals from the flow rate detector 15b and the vending signal generator 45 and controls the water supply valve 13a, the water introduction valve 30a, and the water pump 30b.

Figure 5:
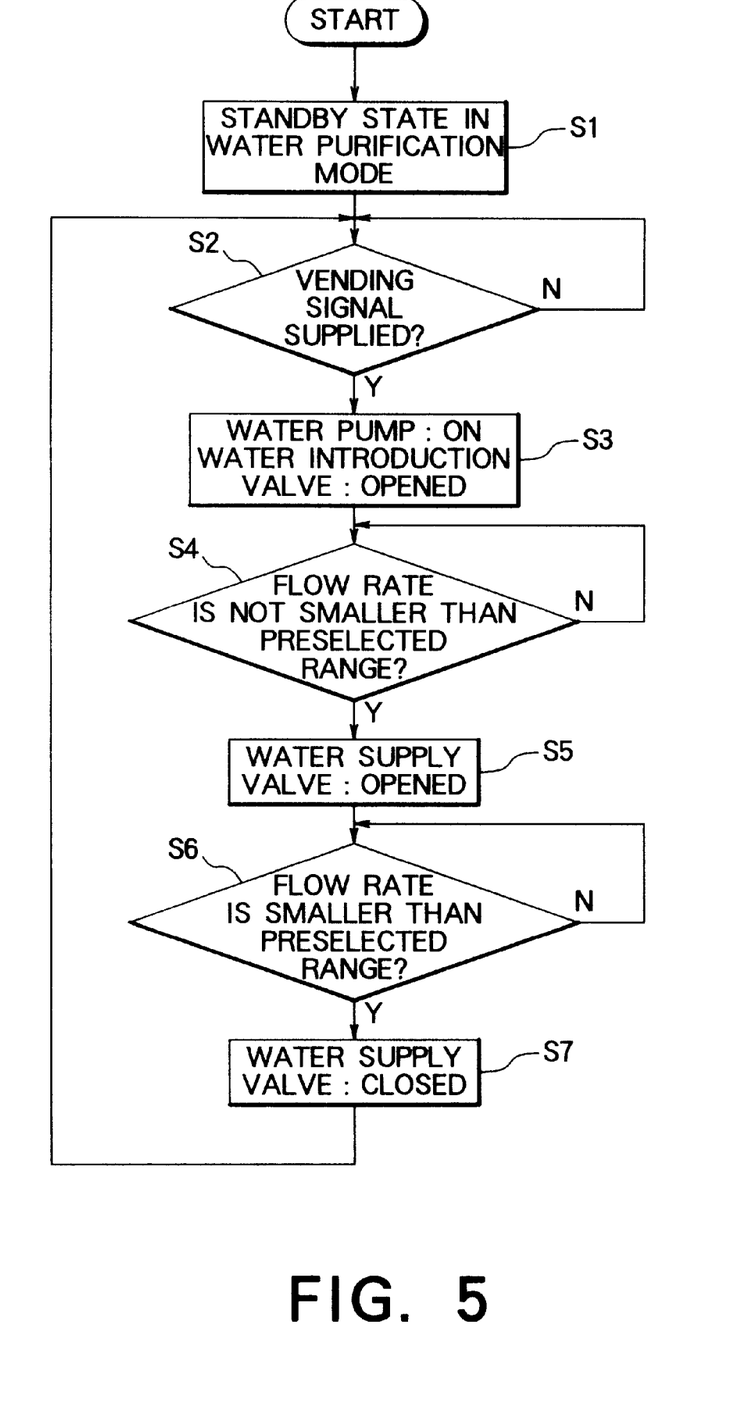
FIG. 5 is a flow chart for describing a water supply operation of the dispensing apparatus illustrated in FIG. 3.

Referring to FIG. 5, the description will be made as regards a control operation of the control unit 40. In a step S1, the dispensing apparatus is in a standby state in the water purification mode. In a step S2 following the step S1, judgement is made about whether or not the vending signal is supplied, i.e., the dispensing valve 33 is opened. If it is judged in the step S2 that the vending signal is supplied, the step S2 proceeds to a step S3 to open the water introduction valve 30a and to operate the water pump 30b. As a consequence, the purified water flows through the water introduction pipe 15. In a step S4 following the step S3, the flow rate of the purified water is detected by the flow rate detector 15b to judge whether or not the flow rate is equal to or greater than a preselected range of the flow rate. If the flow rate is equal to or greater than the predetermined flow rate, the flow rate detector 15b produces the detection signal and the operation proceeds to a step S5. In the step S5, the water supply valve 13a is opened so that the raw water flows into the water purification unit A. After completion of the vending operation, the dispensing valve 33 is closed while the water introduction valve 30a is closed and the water pump 30b is stopped. The step S5 is followed by a step S6 to judge whether or not the flow rate is smaller than the preselected range as a result of completion of the vending operation. If the flow rate is smaller than the preselected range, the step S6 proceeds to a step S7 to close the water supply valve 13a. Then, supply of a next vending signal is waited. On carrying out the steps S4 to S7, a combination of the control unit 40 and the water supply valve 13a is referred to as a control arrangement.

In the embodiment described above, the water supply valve 13a is operated by detecting the water rate flowing through the water introduction pipe 15 irrespective of a pipeline water pressure in the water introduction pipe 15. Therefore, even with a small change in flow rate, the water supply valve 13a can be properly controlled.

As a consequence, it is possible to avoid the variations of dispensed amounts between successive vending operations. During the standby state, the water supply valve 13a is kept closed so that the bacteria hardly intrude through the pouring port of the dispensing valve 33 or the beverage unit B to be mixed into the raw water. Thus, a good sanitary condition is assured. In addition, no additional arrangement against water leakage is required. Furthermore, it is possible to prevent not only the chattering but also the water-hammer.

In the water purification unit A mentioned above, the first and the second electrodes 21 and 22 are applied with the a.c. voltage to heat the adsorber portion 20. Alternatively, as disclosed in Japanese Unexamined Patent Publication (JP-A) No. 5-138158 (138158/1993), the water purification unit A may comprise an electric heater wound around the water tank 10 to heat the adsorber portion 20 to reproduce the adsorber portion 20. In the embodiment described above, the purified water produced by the water purification unit A is directly supplied to the dispensing valve 33 as the dilution water. Alternatively, the purified water may be at first reserved in a cistern and then supplied to the dispensing valve 33 by the water pump 30b. Although the flow switch is used as the flow rate detector 15b in the foregoing embodiment, the flow rate detector 15b may be of any other type as far as the flow rate can be detected.

As described above, the water supply valve is operated by detecting the flow rate through the water introduction pipe irrespective of the pressure therein. Therefore, it is possible to avoid the variations of dispensed amounts between successive vending operations. If the water supply valve is a normally-closed valve, it is kept closed during the standby state. Therefore, the bacteria hardly intrude into the raw water through the pouring port of the beverage unit. Thus, the sanitary condition is excellent. No additional arrangement against a possible water leakage is required. Furthermore, not only the chattering but also the water-hammer can be avoided.

Figure 6:
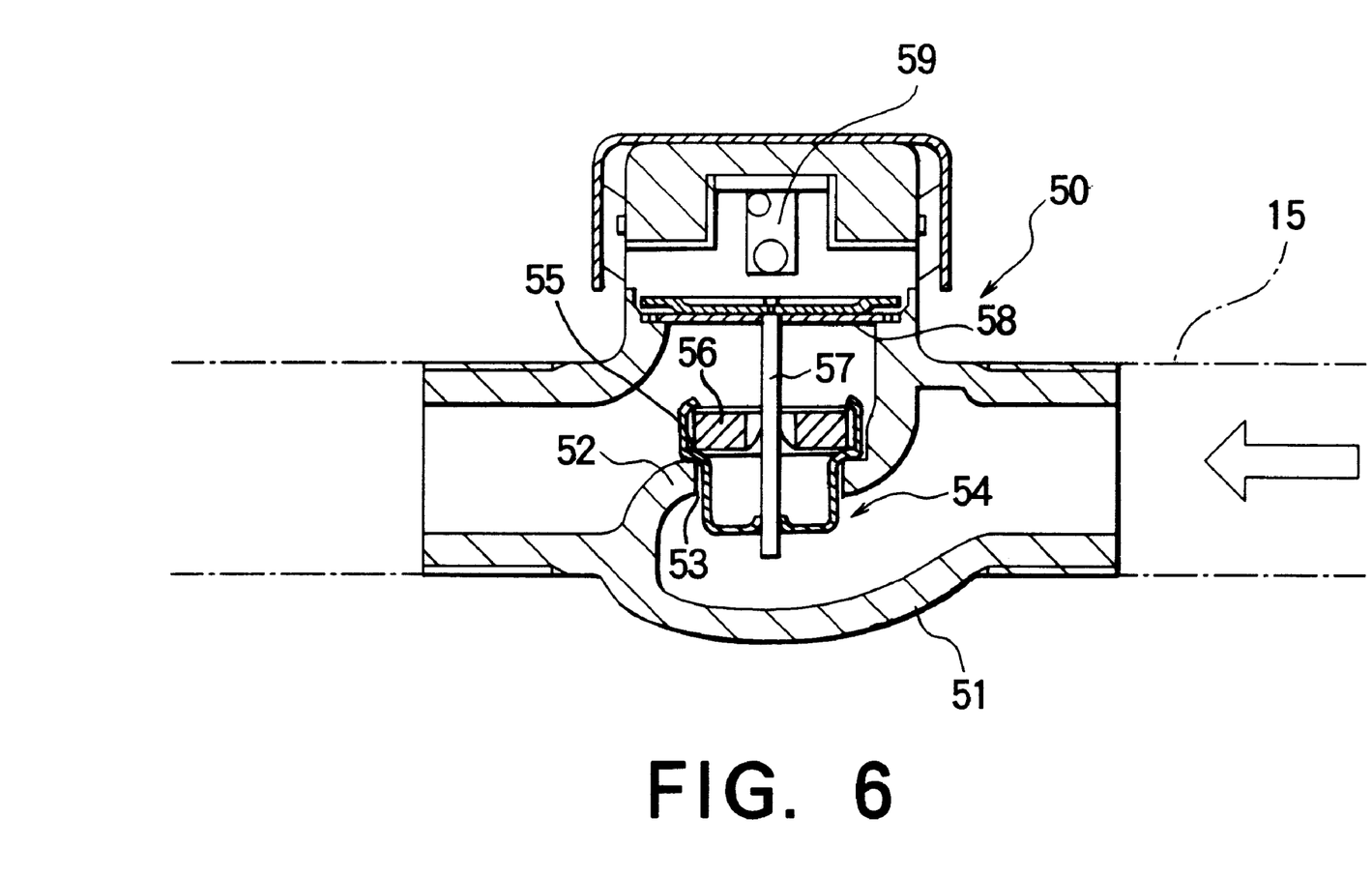
FIG. 6 is a sectional view of a flow switch as an example of a flow rate detector included in the dispensing apparatus of FIG. 3.

Referring to FIG. 6, a flow switch will be described as an example of the flow rate detector 15b. The flow switch is depicted by a reference numeral 50 and is for producing a flow switch signal as the flow rate signal when the flow of the purified water is not less than a predetermined flow rate. The flow switch 50 comprises a switch body 51 connected to the purified water introduction pipe 15 through which the purified water flows in a direction indicated by a white arrow. The switch body 51 is provided with a substantially horizontal sheet portion 52 having a relatively large opening 53 defining a water path. An actuator 54 is placed on the sheet portion 52 with a part thereof being inserted in the opening 53. The actuator 54 comprises a cap-shaped portion 55 and a magnet 56 attached thereto and is vertically movable along a guide rod 57 fixed to the switch body 51 through a cover plate 58. A reed switch 59 is placed outside the cover plate 58 and held to the switch body 51. The reed switch 59 has a sensing region known in the art.

Responsive to flow of the purified water through the purified water introduction pipe 15, the actuator 54 is vertically moved upwardly along the guide rod 57. When the flow rate of the purified water reaches a predetermined flow rate, the magnet 56 is caught in the sensing region of the reed switch 59. Thus, it is detected that the predetermined flow rate is reached. More particularly, the reed switch 59 detects movement of the magnet 56 to produce a reed switch signal as the flow switch signal.

Figure 7:
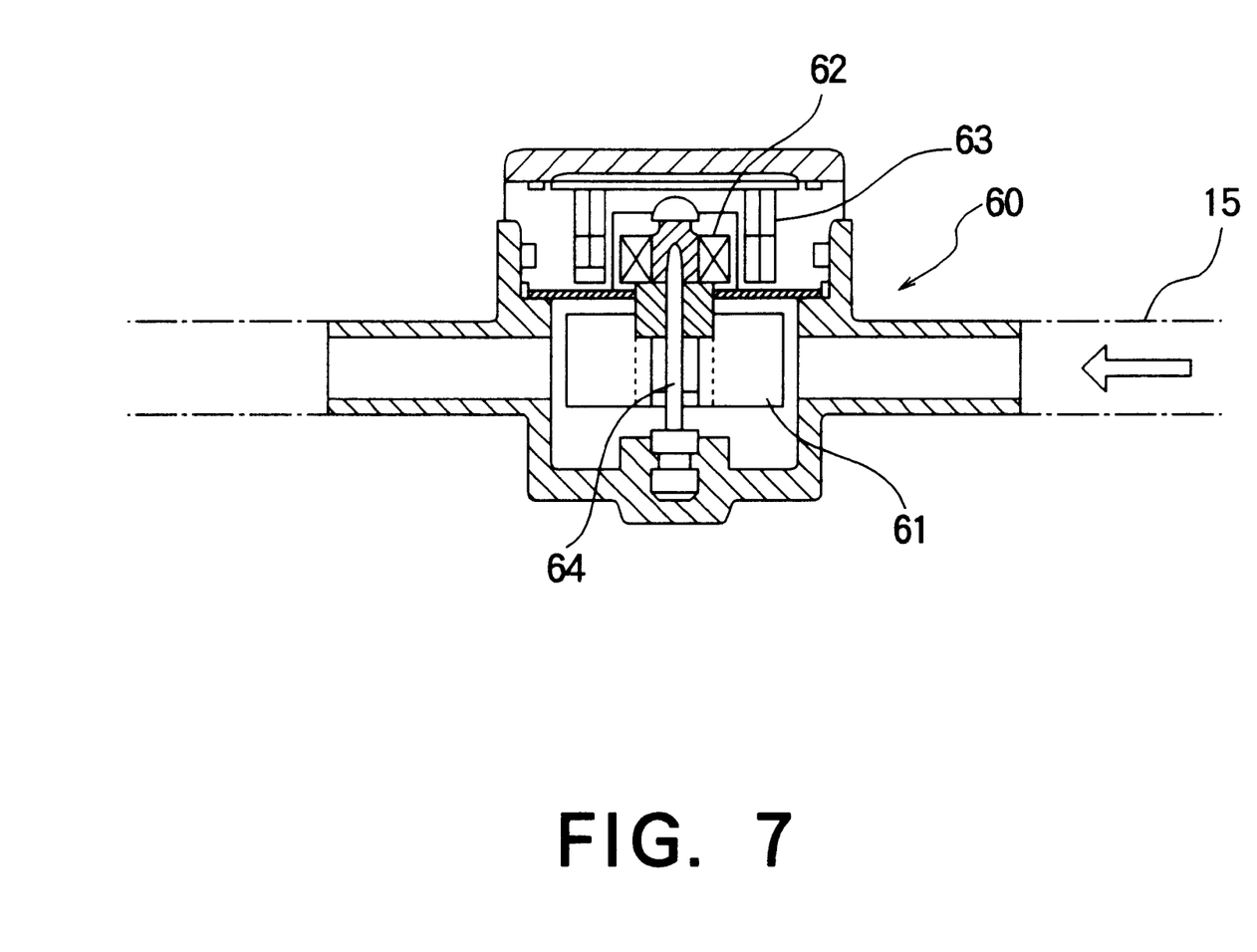
FIG. 7 is a sectional view of a flow rate sensor as another example of the flow rate detector.

Referring to FIG. 7, a flow rate sensor will be described as another example of the flow rate detector 15b. The flow rate sensor is depicted by a reference numeral 60 and is for continuously detecting the flow rate to produce a sensor signal as the flow rate signal. The flow rate sensor 60 comprises an impeller 61 placed in the purified water, a magnet 62 placed outside the purified water and connected to the impeller 61, and a sensor element 63 opposite to the magnet 62. The impeller 61 is rotated with respect to a shaft 64 in response to the flow of the purified water through the purified water introduction pipe 15. In accordance with rotation of the impeller 61, the magnet 62 is rotated. When the magnet 62 is rotated, the sensor element 63 produces an element signal as the sensor signal. A combination of the magnet 62 and the sensor element 63 will be referred to as a rotation detector which is for detecting the number of rotation of the impeller 61 to produce a detector signal as the sensor signal.

While the present invention has thus far been described in conjunction with a few embodiments thereof, it will be possible for those skilled in the art to put this invention into practice in various other manner.

What is claimed is:

1. A dispensing apparatus for dispensing a beverage, comprising a water purification unit for purifying raw water to produce purified water, a beverage unit for producing the beverage by the use of the purified water, a pipeline connected between said water purification unit and said beverage unit for conducting the purified water from said water purification unit to said beverage unit, detecting means connected to said pipeline for detecting flow of the purified water in the pipeline to produce a detected signal, and control means connected to said detecting means for initiating and stopping the supply of the raw water into said water purification unit in response to, presence or absence, respectively, of said detected signal, said detecting means comprising a flow rate detector for detecting a flow rate of the purified water in said pipeline to produce a flow rate signal as said detected signal.

2. A dispensing apparatus as claimed in claim 1, wherein said water purification unit comprises an adsorber portion placed in said raw water for adsorbing unfavorable objects included in said raw water.

3. A dispensing apparatus as claimed in claim 2, wherein said water purification unit further comprises reproducing means operatively coupled to said adsorber portion for heating said adsorber portion to reproduce said adsorber portion.

4. A dispensing apparatus as claimed in claim 3, wherein said adsorber portion is made of conductive material, said reproducing means comprising voltage applying means connected to said adsorber portion for applying an electric voltage to said adsorber portion to heat said adsorber portion.

5. A dispensing apparatus as claimed in claim 1, wherein said flow rate detector comprises a flow switch for producing a flow switch signal as said flow rate signal when said purified water has a flow rate which is not less than a predetermined flow rate.

6. A dispensing apparatus as claimed in claim 5, wherein said flow switch comprises:

an actuator placed in the purified water and moved in response to the flow rate of the purified water flowing through said pipeline;

a magnet held to said actuator; and a reed switch operatively coupled to said magnet for detecting movement of said magnet to produce a reed switch signal as said flow switch signal.

7. A dispensing apparatus as claimed in claim 1, wherein said flow rate detector comprises a flow rate sensor for continuously detecting the flow rate to produce a sensor signal as said flow rate signal.

8. A dispensing apparatus as claimed in claim 7, wherein said flow rate detector comprises:

an impeller placed in the purified water and rotated by the flow of the purified water; and a rotation detector operatively coupled to said impeller for detecting the number of rotation of said impeller to produce a detector signal as said sensor signal.

* * * * *

UNITED STATES PATENT AND TRADEMARK OFFICE
CERTIFICATE OF CORRECTION

PATENT NO.: 6,015,486
DATED: January 18, 2000
INVENTORS: Kazushige WATANABE

It is certified that errors appear in the above-identified patent and that said Letters Patent is hereby corrected as shown below:

In Claim 8, line 28, delete "rotation" and insert --rotations--.

Signed and Sealed this

Fifth Day of December, 2000

Attest:

Q. TODD DICKINSON

*Attesting Officer*  *Director of Patents and Trademarks*